United States Patent
Guillot et al.

(10) Patent No.: US 11,695,326 B2
(45) Date of Patent: Jul. 4, 2023

(54) HALF-BRIDGE ELECTRONIC DEVICE COMPRISING TWO SYSTEMS FOR OPTIMIZING DEAD-TIME BETWEEN THE SWITCHING OPERATIONS OF A HIGH LEVEL SWITCH AND OF A LOW LEVEL SWITCH

(71) Applicant: STMicroelectronics International N.V., Geneva (CH)

(72) Inventors: Laurent Guillot, Seysses (FR); Thierry Sutto, Seysses (FR); Gérald Augustoni, Puyloubier (FR)

(73) Assignee: STMicroelectronics International N.V., Geneva (CH)

( * ) Notice: Subject to any disclaimer, the term of this patent is extended or adjusted under 35 U.S.C. 154(b) by 127 days.

(21) Appl. No.: 17/058,101

(22) PCT Filed: May 14, 2019

(86) PCT No.: PCT/FR2019/051091
§ 371 (c)(1),
(2) Date: Nov. 23, 2020

(87) PCT Pub. No.: WO2019/224451
PCT Pub. Date: Nov. 28, 2019

(65) Prior Publication Data
US 2021/0159774 A1    May 27, 2021

(30) Foreign Application Priority Data
May 22, 2018 (FR) .................................. 1854247

(51) Int. Cl.
*H02M 1/38*    (2007.01)
*H02M 3/158*    (2006.01)

(52) U.S. Cl.
CPC ............. *H02M 1/38* (2013.01); *H02M 3/158* (2013.01)

(58) Field of Classification Search
CPC .............. H02M 1/38–385; H02M 3/155–1588
See application file for complete search history.

(56) References Cited

U.S. PATENT DOCUMENTS

| 6,396,250 B1 | 5/2002 | Bridge |
| 6,614,208 B2 | 9/2003 | Narita |

(Continued)

FOREIGN PATENT DOCUMENTS

FR    3053833 B1    11/2018

OTHER PUBLICATIONS

Z. Liu et al., "A Wide-Input-Range Efficiency-Enhanced Synchronous Integrated LED Driver With Adaptive Resonant Timing Control," in IEEE Journal of Solid-State Circuits, vol. 51, No. 8, pp. 1810-1825, Aug. 2016, doi: 10.1109/JSSC.2016.2567782. (Year: 2016).*

(Continued)

*Primary Examiner* — Fred E Finch, III
(74) *Attorney, Agent, or Firm* — Seed IP Law Group LLP

(57) ABSTRACT

A half-bridge electronic device comprises, in series, a low level switch and a high level switch connected at a central point, and respectively controlled by a first and a second activation/deactivation signal. The device comprises: a first and a second synchronization system configured to interpret a variation in the voltage at the central point, respectively along a falling edge and along a rising edge, and to respectively generate a first and a second synchronization signal separate from the first; a first and a second AND type logic gate respectively combining the first synchronization signal with a first control signal and the second synchronization (Continued)

signal with a second control signal, in order to respectively form the first and second activation/deactivation signals.

20 Claims, 6 Drawing Sheets

(56) References Cited

U.S. PATENT DOCUMENTS

| | | | |
|---|---|---|---|
| 6,861,826 B2 | 3/2005 | Lynch | |
| 11,114,940 B2* | 9/2021 | Guillot | H01L 23/49568 |
| | | | 257/773 |
| 2009/0273957 A1 | 11/2009 | Feldkeller | |
| 2013/0063984 A1* | 3/2013 | Sandner | H02M 1/38 |
| | | | 363/20 |
| 2015/0041984 A1* | 2/2015 | Otremba | H01L 23/49568 |
| | | | 257/773 |
| 2015/0256074 A1* | 9/2015 | Biondi | H02M 3/158 |
| | | | 323/271 |
| 2016/0087543 A1 | 3/2016 | Jin et al. | |
| 2017/0040894 A1* | 2/2017 | MeVay | H02M 7/217 |
| 2019/0140635 A1* | 5/2019 | Abesingha | H03K 17/0822 |
| 2021/0159780 A1* | 5/2021 | Lefevre | H02M 1/38 |

OTHER PUBLICATIONS

International Search Report for International Application No. PCT/FR2019/051091 dated Sep. 25, 2019, 2 pages.
International Written Opinion for International Application No. PCT/FR2019/051091 dated Sep. 25, 2019, 7 pages.
Liu et al., "A Wide-Input-Range Efficiency-Enhanced Synchronous Integrated LED Driver With Adaptive Resonant Timing Control," *IEEE Journal of Solid-State Circuits* 51(S): 1810-1825, Aug. 2016.

* cited by examiner

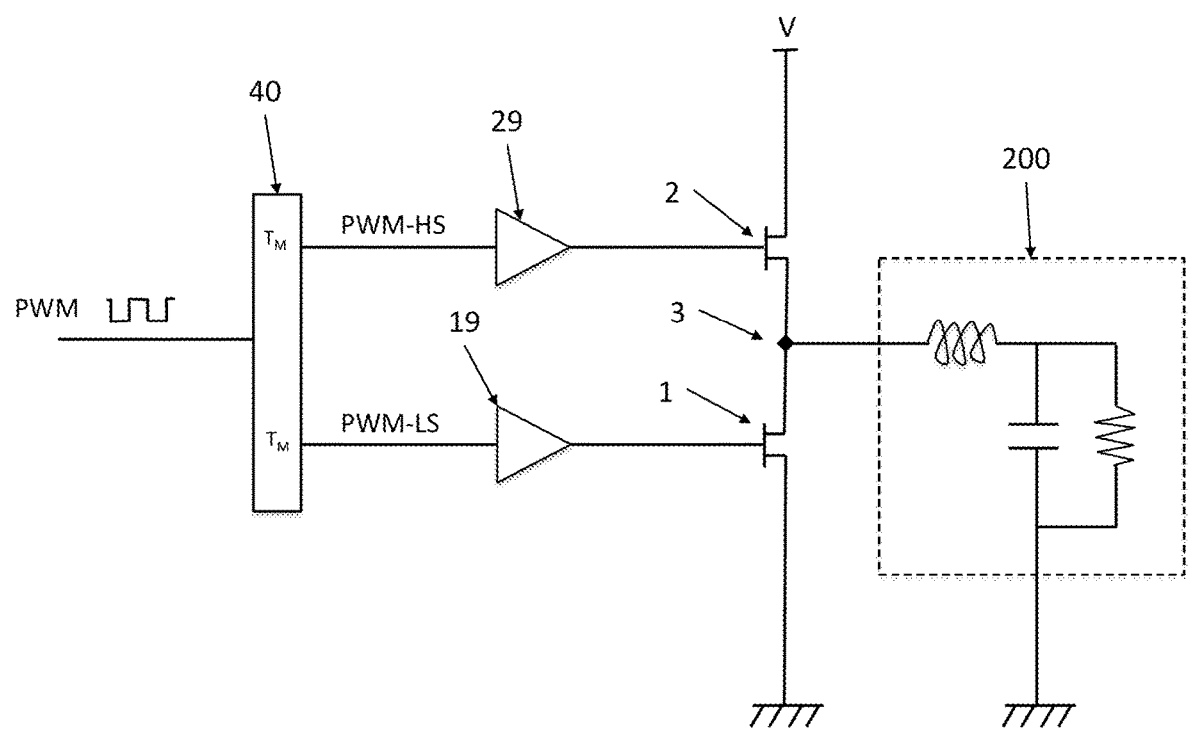
FIG 1a - Prior art
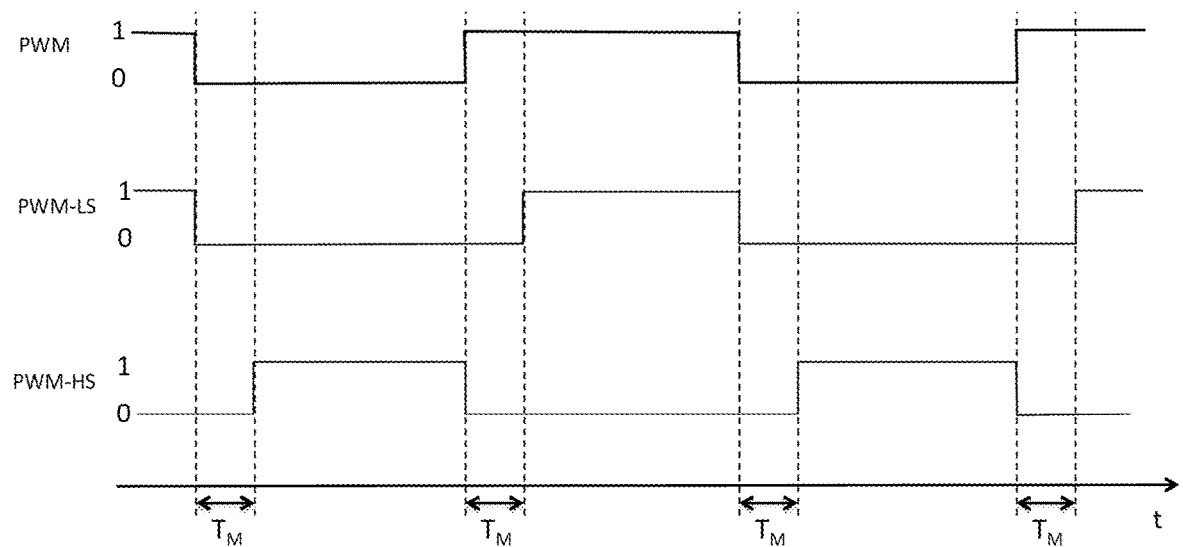
FIG 1b - Prior art

HALF-BRIDGE ELECTRONIC DEVICE COMPRISING TWO SYSTEMS FOR OPTIMIZING DEAD-TIME BETWEEN THE SWITCHING OPERATIONS OF A HIGH LEVEL SWITCH AND OF A LOW LEVEL SWITCH

CROSS-REFERENCE TO RELATED APPLICATIONS

This application is a national phase entry under 35 U.S.C. § 371 of International Patent Application PCT/FR2019/051091, filed May 14, 2019, designating the United States of America and published as International Patent Publication WO 2019/224451 A1 on Nov. 28, 2019, which claims the benefit under Article 8 of the Patent Cooperation Treaty to French Patent Application Serial No. 1854247, filed May 22, 2018.

TECHNICAL FIELD

The present disclosure relates to the field of power electronics. It relates, in particular, to an electronic half-bridge device comprising two synchronization devices making it possible to safely optimize the dead-times between the alternating activation of a high-side switch and a low-side switch, the device being used, in particular, in a DC-DC converter.

BACKGROUND

Half-bridge electronic devices, composed of a high-side switch and a low-side switch, are commonly used in DC-DC converters to convert one DC voltage to another DC voltage of lower value.

In these half-bridge devices, the two switches, formed by transistors, are connected in series at a central point, to which a load is connected. As already known in the field of DC-DC converters, the load is selectively coupled either to the DC voltage source by activating (switching on) the "high-side" switch or to ground by activating the "low-side" switch.

A DC-DC converter may suffer significant electrical losses due to the dead-time between deactivating (turning off) the "high-side" switch and activating the "low-side" switch, and between deactivating the "low-side" switch and activating the "high-side" switch.

To maximize the efficiency of the converter, it is therefore desirable to minimize these switching dead-times, while avoiding simultaneous conduction of the "high-side" and "low-side" switches that would cause a short circuit between the voltage source and ground.

It is known to implement control systems in half-bridge electronic devices to optimize switching dead-times. In particular, documents U.S. Pat. Nos. 6,396,250 and 6,861,826 are known, which propose control systems for synchronizing the activation and deactivation of "high-side" and "low-side" switches in a converter, using the measurement of the voltage at the central point.

With the implementation of fast-switching switches (in particular, formed from GaN transistors) in half-bridge electronic devices, an additional constraint arises: since the typical switching times of these switches are reduced from about 100 nanoseconds to about 10 nanoseconds, the measurement, analysis and response time of the control system must be of the same order of magnitude, in order to efficiently optimize the dead-times between the switching operations of the switches.

BRIEF SUMMARY

In one embodiment of the present disclosure, an alternative solution to the solutions of the prior art is disclosed. One embodiment of this disclosure is, in particular, a half-bridge electronic device comprising two synchronization systems that efficiently and safely minimizes dead-times between successive switching operations of the switches.

The present disclosure relates to a half-bridge electronic device comprising, in series, a high-side switch and a low-side switch connected at a central point, the low-side switch and the high-side switch being respectively controlled by a first and a second activation/deactivation signal.

The Device Comprises:
  a first synchronization system configured to interpret a variation in the voltage at the central point, along a falling edge, and to generate a first synchronization signal;
  a second synchronization system configured to interpret a variation in the voltage at the central point, along a rising edge, and to generate a second synchronization signal separate from the first synchronization signal;
  a first AND type logic gate combining the first synchronization signal with a first control signal in order to form, at the output of said first logic gate, the first activation/deactivation signal;
  a second AND type logic gate combining the second synchronization signal with a second control signal in order to form, at the output of said second logic gate, the second activation/deactivation signal.

According to other advantageous and non-limiting features of the present disclosure, taken alone or in any technically feasible combination:
  each synchronization system comprises a detection circuit and a processing circuit;
  each detection circuit comprises a capacitive element for generating a transient current dependent on variations in the voltage at the central point;
  each detection circuit comprises, in series with the capacitive element, a diode and a shunt resistor for measuring a voltage proportional to the transient current;
  each processing circuit is configured to generate the synchronization signal from measurements of the detection circuit;
  each processing circuit includes a voltage comparator and a memory point;
  each processing circuit comprises an OR type logic gate, between the voltage comparator and the memory point, combining a comparator output signal and a control signal delayed by a defined delay;
  the second detection circuit is configured to interpret a variation, along a falling edge, of the voltage resulting from the difference between the input voltage of the high-side switch and the voltage at the central point;
  the first synchronization system and the second synchronization system are formed of identical detection and processing circuits;
  at least one of the switches comprises a high-voltage transistor;
  the high-voltage transistor is GaN-based;
  at least one of the switches comprises a high-voltage transistor in depletion mode in series with a low-voltage transistor in enhancement mode.

The present disclosure also relates to a method of synchronizing the alternate activation of a low-side switch and a high-side switch in a half-bridge electronic device. It comprises the following steps:

a) deactivating the low-side switch when a first control signal goes to state 0, b) interpreting a variation along a rising edge of the voltage at the central point, in order to generate a second synchronization signal, c) activating the high-side switch by a second activation/deactivation signal resulting directly from the combination of the second synchronization signal with a second control signal in an AND type logic gate, d) deactivating the high-side switch when the second control signal goes to state 0, e) interpreting a variation along a falling edge of the voltage at the central point to generate a first synchronization signal, separate from the second synchronization signal, f) activating the low-side switch, by a first activation/deactivation signal resulting directly from the combination of the first synchronization signal with the first control signal in an AND logic gate.

According to other advantageous and non-limiting features of the present disclosure, taken alone or in any technically feasible combination:

- steps a) to f) are repeated for each new cycle of alternating switching operations of the low-side switch and the high-side switch;
- step b) is carried out by interpreting a variation, along a falling edge, of the voltage resulting from the difference between the input voltage of the high-side switch and the voltage at the central point;
- the method comprises a step b') carried out in the event of failure in step b) in the interpretation of a variation along a rising edge of the voltage at the central point, making it possible to generate the second synchronization signal after a defined delay;
- the method comprises a step e') performed in the event of a failure in step e) in the interpretation of a variation along a falling edge of the voltage at the central point, making it possible to generate the first synchronization signal after a defined delay.

BRIEF DESCRIPTION OF THE DRAWINGS

Other features and advantages of the present disclosure will become apparent from the following detailed description provided with reference to the accompanying figures, in which:

FIGS. 1a and 1b show, respectively, a schematic diagram and a chronogram of a half-bridge electronic device according to the prior art;

DETAILED DESCRIPTION

Figure 2A:
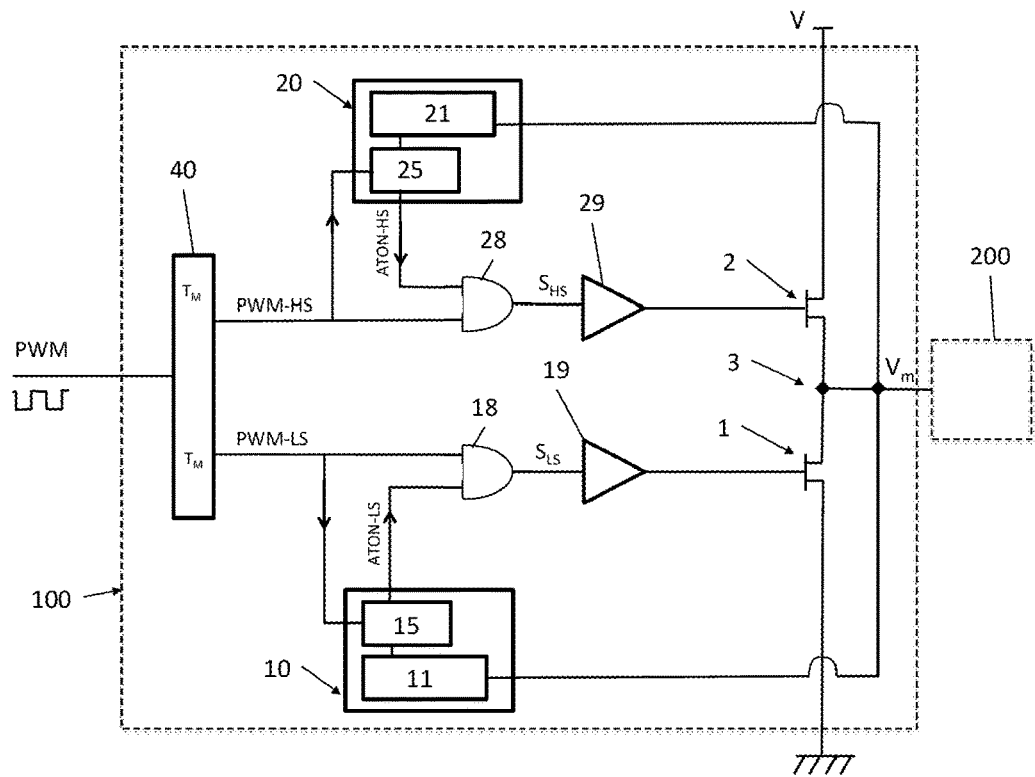
FIGS. 2a and 2b show schematic diagrams of a half-bridge electronic device according to a first and a second embodiment of the present disclosure.

In the descriptive part, the same references in the drawings can be used for elements of the same nature.

The present disclosure relates to a half-bridge electronic device 100 comprising, in series, a high-side switch 2 and a low-side switch 2.

Usually, in such a device, the two switches 1, 2 are connected together at a central point 3 (FIG. 1a). The high-side switch 2 is also connected to a voltage source V, which can be a high-voltage source (from a few tens of volts to a few hundred volts); the low-side switch 1 is also connected to ground. A load 200, as, for example, shown in FIG. 1a, is intended to be connected to the central point 3.

In a standard mode of operation, a PWM (pulse width modulation) input signal is sent to the low-side switch 1 and high-side switch 2 via a first control circuit 19 and a second control circuit 29, respectively. The PWM input signal is translated into pulses to activate and deactivate the high-side switch 2 and alternately deactivate and activate the low-side switch 1.

The term "activate" means to close the switch such that it allows the passage; deactivate means to open the switch to make it block the passage.

In order to avoid any short-circuit due to simultaneous activation of both switches 1, 2, it is necessary to anticipate dead-times $T_M$ between the deactivation of one switch and the activation of the other (FIG. 1b).

A delay generating device 40 (FIG. 1a), receiving the PWM input signal, usually generates a control signal PWM-LS (called a first control signal), of the same polarity as the PWM input signal, and whose pulses (activated state 1) are shifted by one time $T_M$ with respect to the PWM input signal. The delay generating device 40 also generates a control signal PWM-HS (called a second control signal), which is of reverse polarity with respect to the PWM input signal, and whose pulses (activated state 1) are also shifted by a time $T_M$ with respect to the PWM input signal.

The first control circuit 19 receives, as input, the first control signal PWM-LS, which will control the activation/deactivation of the low-side switch 1. The second control circuit 29 receives, as input, the second control signal PWM-HS (of reverse polarity with respect to the first control signal PWM-LS), which will control the activation/deactivation of the high-side switch 2.

Of course, as previously stated, it is important to minimize induced dead-times $T_M$ (FIG. 1a) to avoid significant electrical losses in a converter that comprises the device.

Figure 2B:
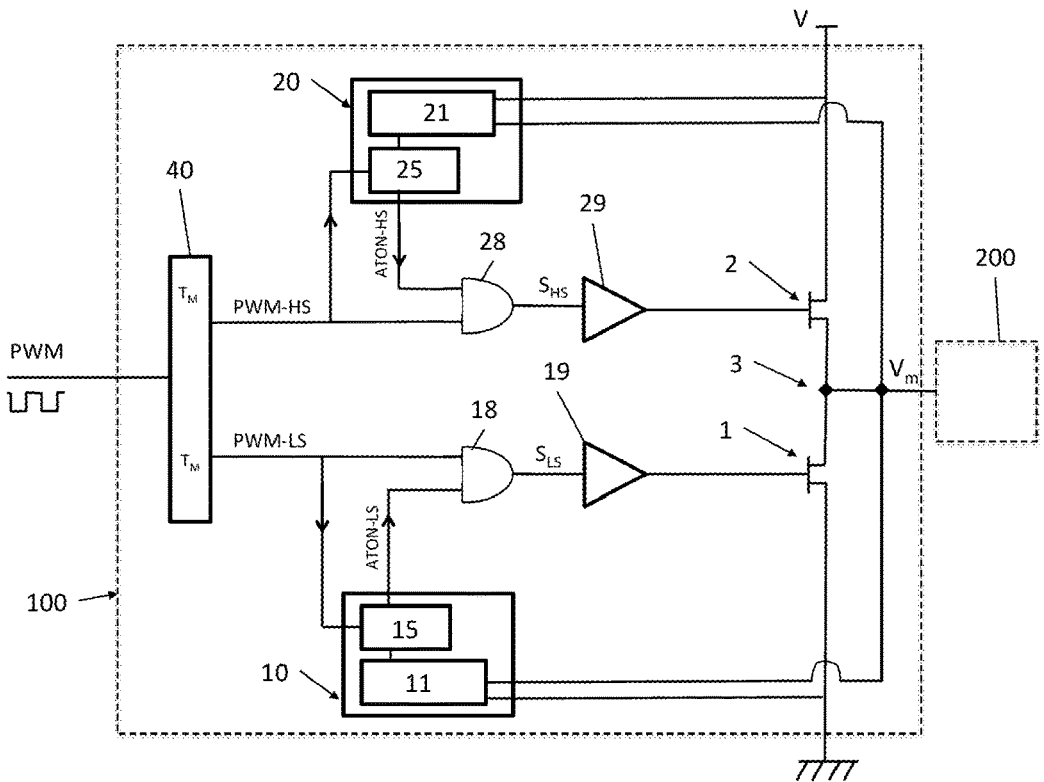

The half-bridge electronic device 100 according to the present disclosure comprises a first synchronization system 10 and a second 20 synchronization system, respectively intended to send a synchronization signal ATON-LS ("Automatic Turn ON—Low Side") to enable activation of the low-side switch 1, and a synchronization signal ATON-HS ("Automatic Turn ON—High Side") to enable activation of the high-side switch 2 (FIGS. 2a, 2b).

The first synchronization system 10 is configured to interpret a falling edge variation of the voltage Vm at the central point 3 and to generate the first synchronization signal ATON-LS; the second synchronization system 20 is configured to interpret a rising edge variation of the voltage Vm at the central point 3 and to generate the second synchronization signal ATON-HS, separate from the first synchronization signal ATON-LS.

A first AND type logic gate 18 combines the first synchronization signal ATON-LS with a first control signal PWM-LS, to form, directly at the output of said first logic gate 18, a first activation/deactivation signal $S_{LS}$, which, sent to the input of the first control circuit 19, will control the activation/deactivation of the low-side switch 1.

A second AND type logic gate 28 combines the second synchronization signal ATON-HS with the second control signal PWM-HS, to form, directly at the output of said second logic gate 28, the second activation/deactivation signal $S_{HS}$, which, sent to the input of the second control circuit 29, will command the activation/deactivation of the high-side switch 2.

The fixed dead-time $T_M$ implemented on the first and the second control signal PWM-HS, PWM-LS can be minimized to a maximum or even zero; in fact, the first and second synchronization signals ATON-LS, ATON-HS make it possible to activate, respectively, the low-side switch 1 and the high-side switch 2 at the earliest after the deactivation respectively of the high-side switch 2 and the low-side switch 1, by observing the voltage variation at the central point 3.

The AND logic gates 18, 28 require that the synchronization signal ATON-LS, ATON-HS and the control signal PWM-LS, PWM-HS of each switch 1, 2 are in the activated state 1, in order to generate the activation signal $S_{LS}$, $S_{HS}$, which avoids simultaneous conduction of both switches 1, 2. The combination of the synchronization signal (ATON-LS or ATON-HS) with the control signal (PWM-LS or PWM-HS) in the AND type logic gate (18 or 28) also makes it possible to secure any unintentional switching that would be linked to a failure of the associated synchronization system 10, 20. To compensate for a failure of the first and second synchronization systems 10, 20 (failure to generate the first synchronization signal ATON-LS and the second synchronization signal ATON-HS, respectively), the first activation/deactivation signal $S_{LS}$ and the second activation/deactivation signal $S_{HS}$ for the activation of the low-side switch 1 and the high-side switch 2, respectively, are formed after a defined delay $t_{TO}$. As an example, $t_{TO}$ will be defined in a range of 20 ns to 50 ns.

The presence of two synchronization systems 10, 20, dedicated respectively to the low-side switch 1 and to the high-side switch 2, which generate two separate and independent synchronization signals ATON-LS, ATON-HS, allows an optimized and independent control for each of the switches and not an identical dead-time prediction for both switches or dependent on both switches.

The two synchronization systems 10, 20 thus allow the safe and efficient optimization of the dead-times between the alternating activation of a high-side switch 2 and a low-side switch 1.

Each synchronization system 10, 20 comprises a detection circuit 11, 21 to interpret the variation in time (dVm/dt) of the voltage Vm at the central point 3. As shown in the chronogram in FIG. 3, the voltage Vm at the central point 3 will vary over time, depending on whether the high-side switch 2 or low-side switch 1 is respectively activated (closed) or deactivated (open). In practice, the voltage Vm at the central point 3 will decrease as soon as the high-side switch 2 is opened (deactivated); it will increase as soon as the low-side switch 1 is opened (deactivated).

The first detection circuit 11, included in the first synchronization system 10, is designed to detect the falling edges of the voltage Vm at the central point 3. The second detection circuit 21, included in the second synchronization system 20, is designed to detect the rising edges of the voltage Vm at the central point 3.

Figure 4A:
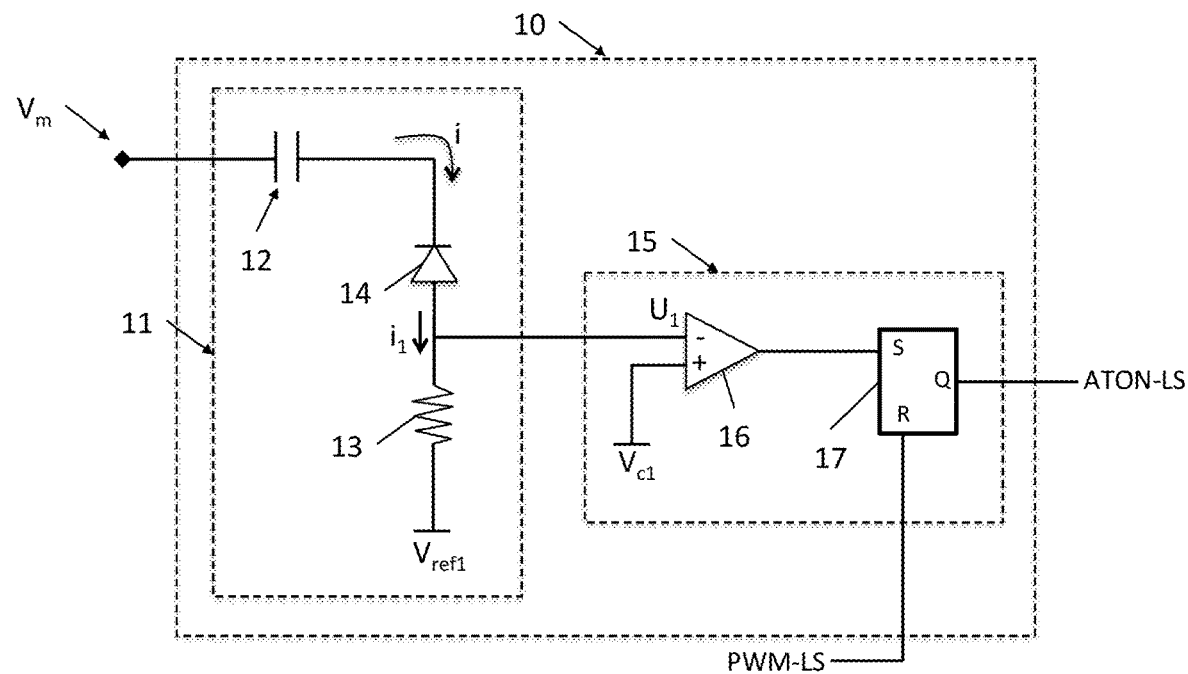
FIGS. 4a and 4b show synchronization systems for a half-bridge electronic device in a first embodiment of the present disclosure.
Figure 4B:
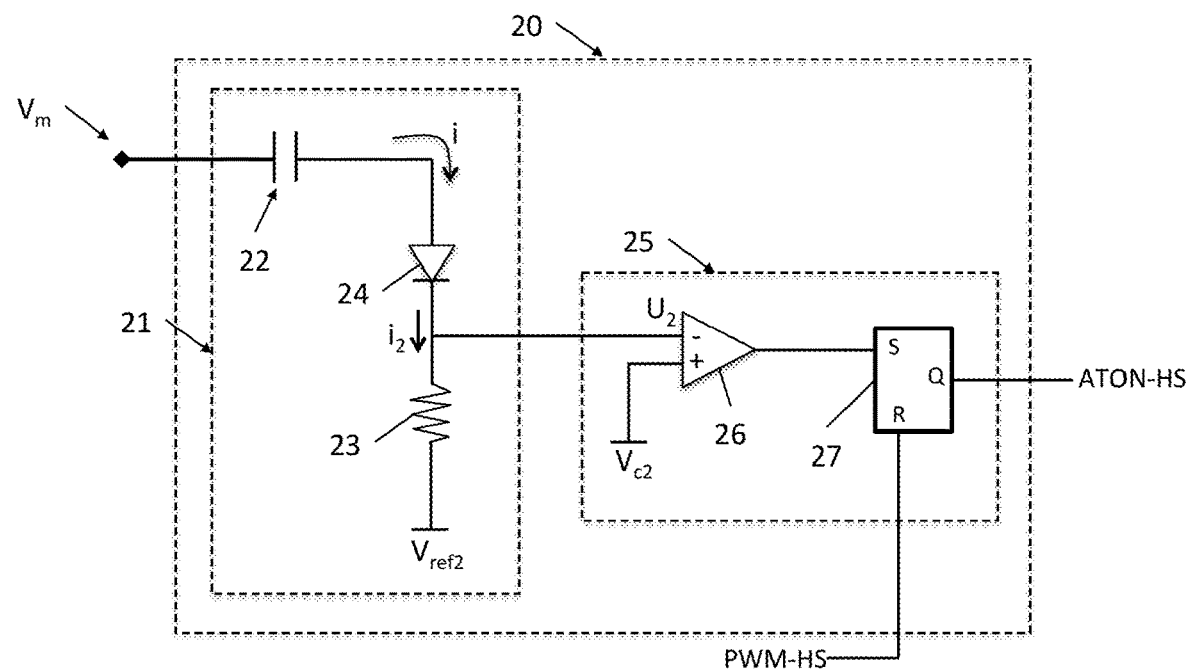

According to a first embodiment (FIG. 2a), each detection circuit 11, 21 comprises a capacitive element 12, 22 directly connected to the central point 3 (FIGS. 4a, 4b). This capacitive element 12, 22 will generate a transient current i depending on the time variation of the voltage Vm at the central point 3. The capacitive element 12, 22 must be compatible with the maximum level that can be reached by the voltage Vm at the central point 3, i.e., at least the voltage V of the voltage source connected to the input of the high-side switch 2. The use of a capacitive element 12, 22 makes it possible to dispense in the detection circuit 11, 21 with an active measuring component capable of holding the voltage V of the voltage source. As an example, the capacitive element 12, 22 could consist of a capacitor dimensioned according to the voltage V of the voltage source (from a few tens of volts to a few hundreds of volts). According to another advantageous example, the capacitive element 12, 22 could consist of two coplanar metal lines arranged on a printed circuit incorporating the half-bridge electronic device 100, also dimensioned according to the voltage V of the voltage source.

According to a first approach (not shown), the transient current i can be measured directly by an ammeter, connected in series with the capacitive element 12, 22.

According to a second, more advantageous approach, each detection circuit 11, 21 comprises, in series with the capacitive element 12, 22, a shunt resistor 13, 23 (FIGS. 4a, 4b). It makes it possible to measure, at its terminals, a voltage $U_1$, $U_2$ proportional to the transient current i. Each detection circuit 11, 21 can thus produce a measurement of the voltage $U_1$, $U_2$, which is representative of the variations of the voltage Vm at the central point 3.

Advantageously, each detection circuit 11, 21 also includes a diode 14, 24 in series with the shunt resistor 13, 23, the latter being connected to ground or to a reference voltage $V_{ref1}$, $V_{ref2}$.

The diode 14, 24 allows the transient current i to flow through the shunt resistor 13, 23 only for a defined polarity. Depending on whether the voltage Vm at the central point 3 varies according to a falling or rising edge, the transient current i generated at the output of the capacitive element 12, 22 will be positive or negative. Thus, the diode 14 is configured to allow only the passage of the transient current $i_1$ linked to a falling edge of the voltage Vm at the central point 3, while the diode 24 is configured to allow only the passage of the transient current $i_2$ (of opposite sign to $i_1$) linked to a rising edge of the voltage Vm at the central point 3.

According to a second embodiment FIG. 2b), the first synchronization system 10 and the second synchronization system 20 are both formed of identical detection circuits 11, 21.

For this Purpose:
the first detection circuit 11 is configured to detect the falling edges of the voltage Vm at the central point 3, as in the first implementation mode; and
the second detection circuit 21 is configured to interpret a variation, along a falling edge, of the voltage (V-Vm) resulting from the difference between the input voltage V of the high-side switch 2 and the voltage Vm at the central point 3.

Figure 5A:
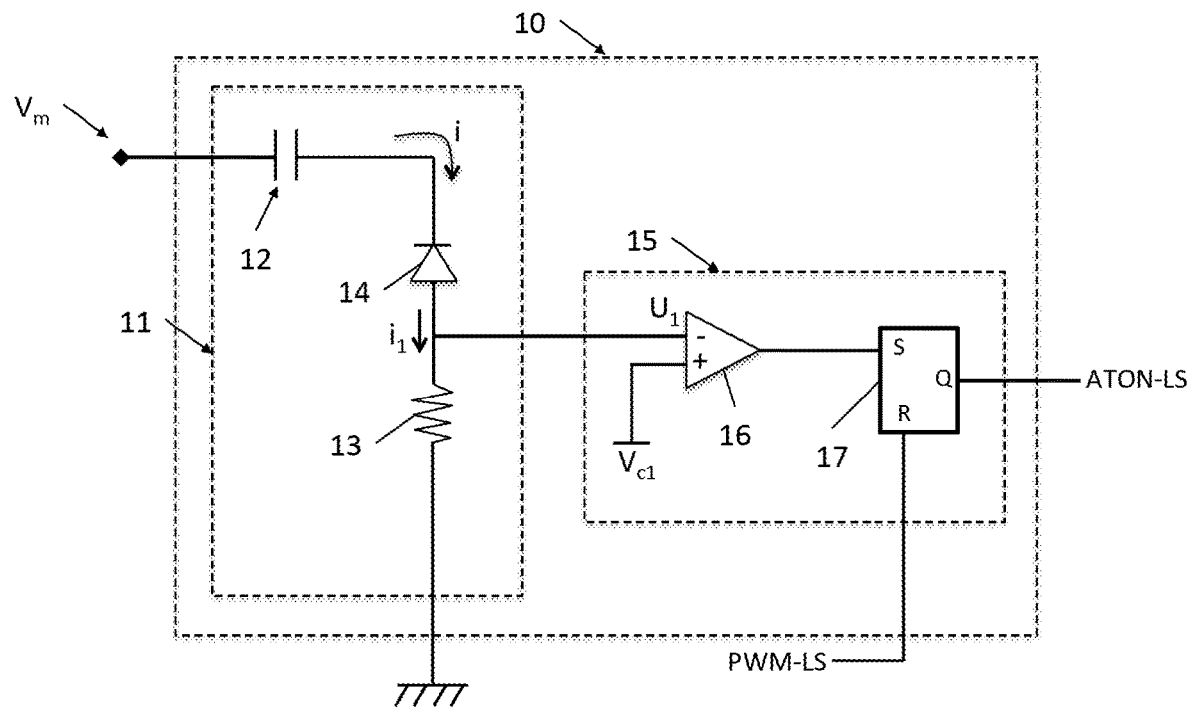
FIGS. 5a and 5b show synchronization systems for a half-bridge electronic device in a second embodiment of the present disclosure.
Figure 5B:
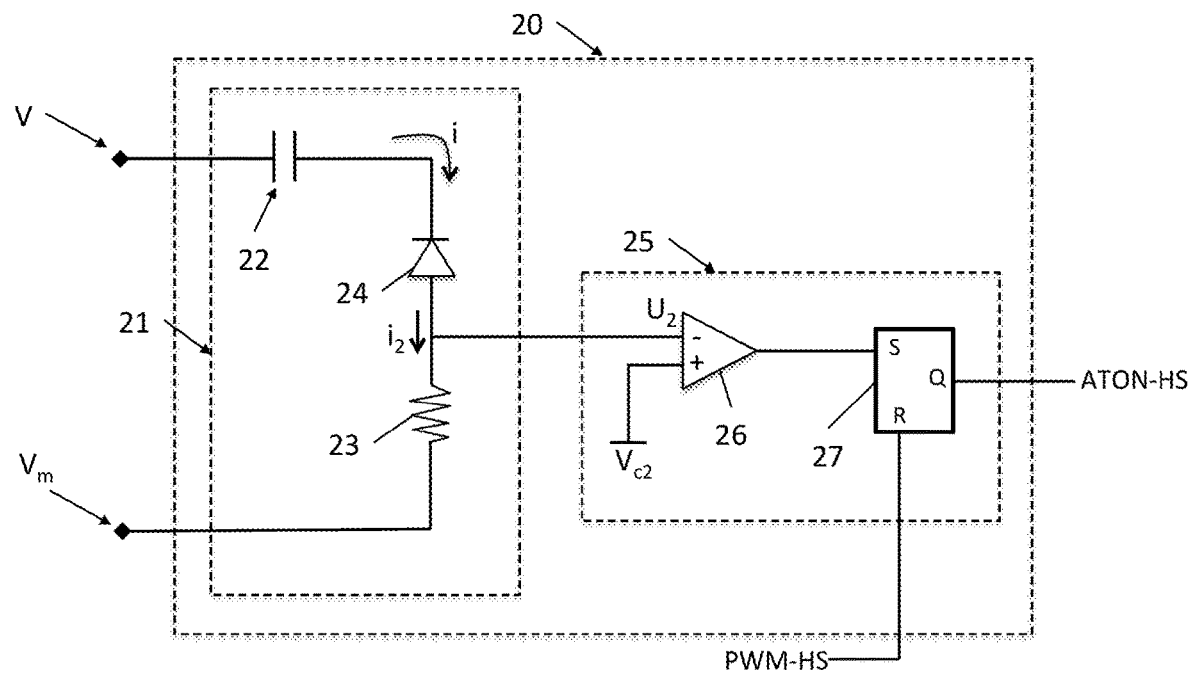

The first detection circuit 11 comprises a capacitive element 12, 22 connected to the central point 3, and the reference voltage $V_{ref1}$ is ground, as shown in FIG. 5a. The second detection circuit 21 comprises a capacitive element connected to the input voltage V, and the reference voltage $V_{ref2}$ is the voltage Vm at central point 3, as shown in FIG. 5b.

The first detection circuit 11 and the second detection circuit 21 both then aim to interpret a variation along a falling edge, respectively, of the voltage Vm at the central point 3 and of the above-mentioned voltage (V-Vm). The components previously described in the first embodiment (the diode 14, 24 and shunt resistor 13, 23) forming the first and second detection circuit 11, 21 can thus be the same for the two synchronization systems 10, 20, which simplifies the industrial implementation of the present disclosure.

In the following description, reference is made to the first embodiment of the detection circuits 11, 21 for the sake of simplification; of course, the second embodiment described above is also applicable.

The first detection circuit 11 is thus configured to interpret a falling edge of the voltage Vm at the central point 3: it allows a direct or indirect measurement of the transient current $i_1$ due to a decreasing time variation (falling edge) of the voltage Vm at the central point 3.

From this measurement, the first synchronization system 10 must generate a first synchronization signal ATON-LS to enable the activation of the low-side switch 1.

Figure 3:
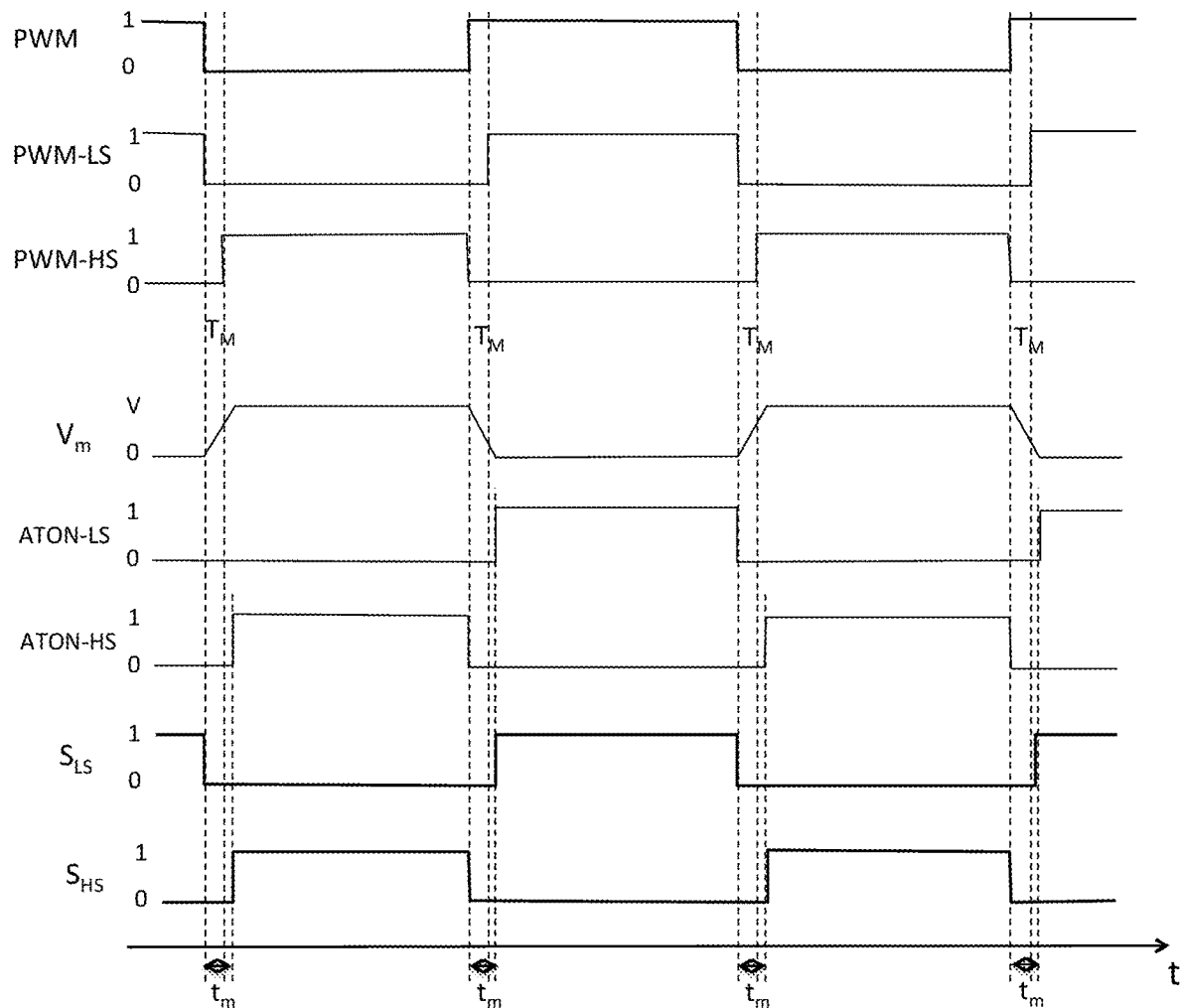
FIG. 3 shows a chronogram of the control signals, synchronization signals and activation/deactivation signals of the switches of the half-bridge electronic device according to the present disclosure.

For this, the first synchronization system 10 advantageously comprises a first processing circuit 15 (FIGS. 2a, 2b). This processing circuit 15 comprises a voltage comparator 16, which compares the value of the measured voltage $U_1$ (proportional to the transient current $i_1$) with a setpoint voltage $V_{c1}$ (FIGS. 4a, 5a). As soon as the measured voltage $U_1$ is higher than the setpoint voltage $V_{c1}$, the comparator 16 will send a pulse to a memory location 17. Said pulse will cause the first synchronization signal ATON-LS, at the output of the memory point 17, to enter an activated state 1 (FIG. 3). As an example, the memory point 17 can be realized by an asynchronous latch. The memory point 17 (ATON-LS) is reset as soon as the control signal PWM-LS changes to state 0 (FIG. 3).

The first synchronization signal ATON-LS, generated by the first synchronization system 10, and the first control signal PWM-LS are then combined in an AND type logic gate 18 in order to form, directly at the output of said logic gate 18, the first activation/deactivation signal $S_{LS}$ (FIG. 3). The first activation/deactivation signal $S_{LS}$ is transmitted to the first control circuit 19 and will activate/deactivate the low-side switch 1.

In the first synchronization system 10, the difference between the setpoint voltage and the reference voltage $(V_{c1}-V_{ref1})$ is used to adjust the switching level $(U_1 > V_{c1})$ of the voltage comparator 16, to create the signal ATON-LS. Adjusting this level compensates for the propagation time of the system: for example, this voltage difference can be defined so that the signal ATON-LS is activated in state 1 approximately before Vm reaches its minimum value.

The second detection circuit 21 is configured, for its part, to interpret a rising edge of the voltage Vm at the central point 3. It makes it possible to take a direct or indirect measurement of the transient current $i_2$ due to an increasing temporal variation of the voltage Vm at the central point 3.

From this measurement, the second synchronization system 20 must generate a synchronization signal ATON-HS to enable the activation of the high-side switch 2.

For this purpose, the second synchronization system 20 advantageously comprises a second processing circuit 25 (FIGS. 2a, 2b). This processing circuit 25 comprises a voltage comparator 26, which compares the value of the measured voltage $U_2$ (proportional to the transient current $i_2$) with a setpoint voltage $V_{c2}$ (FIGS. 4b, 5b). As soon as the measured voltage $U_2$ is higher than the setpoint voltage $V_{c2}$, the comparator 26 will send a pulse to a memory point 27. This pulse causes the second synchronization signal ATON-HS at the output of the memory location 27 to switch to an activated state 1. As an example, the memory point 27 can be realized by an asynchronous latch. The memory point 27 (ATON-HS) is reset to zero as soon as the control signal PWM-HS changes to the state 0 (FIG. 3).

The second synchronization signal ATON-HS, generated by the second synchronization system 20, and the second control signal PWM-HS are then combined in an AND type logic gate 28 in order to form, directly at the output of said logic gate 28, a second $S_{HS}$ activation/deactivation signal (FIG. 3). The second activation/deactivation signal $S_{HS}$ is transmitted to the second control circuit 29 and will activate/deactivate the high-side switch 2.

In the second synchronization system 20, the difference between the setpoint voltage and the reference voltage $(V_{c2}-V_{ref2})$ is used to adjust the switching level $(U_2 > V_{c2})$ of the voltage comparator 26, to create the signal ATON-HS. Adjusting this level makes it possible to compensate for the propagation time of the system: for example, this voltage difference can be defined so that the signal ATON-HS is activated in the state 1 substantially before Vm reaches its maximum value.

As shown in the chronogram in FIG. 3, the first and second activation/deactivation signals $S_{LS}$, $S_{HS}$ make it possible to optimize the dead-times $t_m$ by activating the low-side switch 1 and the high-side switch 2, respectively, at the earliest after the other switch has been deactivated. In fact, starting from a fixed minimum delay $T_M$ (for example, 0 to 20 ns) between the control signals PWM-LS and PWM-HS, the synchronization signals ATON-LS and ATON-HS combined with said control signals PWM-LS, PWM-HS in an AND type logic gate 18, 28, are able to switch to the state 1, respectively, the first and the second activation/deactivation signal $S_{LS}$, $S_{HS}$ controlling the low-side switch 1 and high-side switch 2: This makes it possible to secure the alternating switching of the switches 1,2, with optimized effective dead-times $t_m$ (for example, between 4 and 30 ns).

The optimization of the dead-times $t_m$ makes it possible to minimize the losses, thus maximizing the output (or energy efficiency) of the converter equipped with the half-bridge electronic device 100.

The synchronization signals ATON-LS and ATON-HS are generated for each switching operation of the low-side switch 1 and high-side switch 2; the half-bridge electronic device 100 according to the present disclosure thus allows automatic activation (setting to state 1) of one switch 1, 2 with each switching cycle, and at the earliest after deactivation of the other switch 2, 1, by interpreting the variation of the voltage Vm at the central point 3.

The fact that each synchronization system 10, 20 is dedicated to the activation of a switch 1, 2 also allows an efficient interpretation of the voltage variation Vm and a direct and fast transmission of the instruction to the associated switch.

DC-DC converters with fast switches 1, 2 allow switching times from 5 to 20 ns of signal Vm: in this case, the synchronization system 10, 20 must have a response time below these values to minimize the dead-time.

Figure 6:
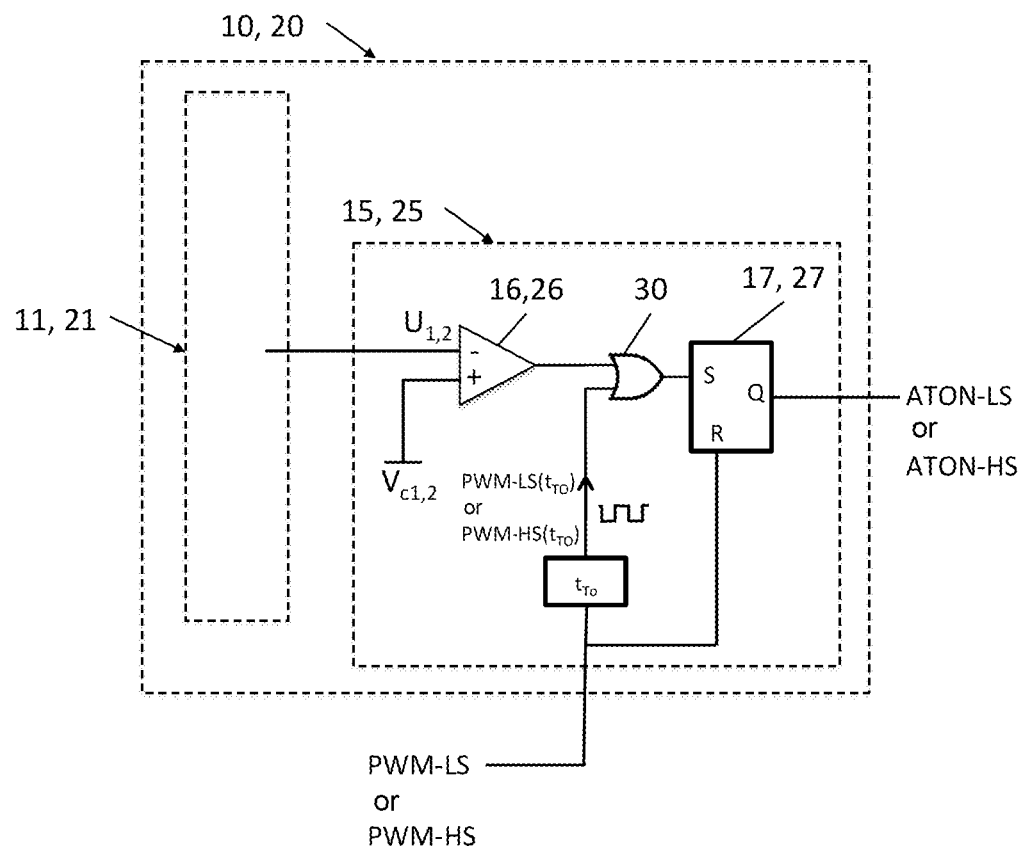
FIG. 6 shows a synchronization system for a half-bridge electronic device according to a variant of the present disclosure.

To compensate for a failure of the detection circuits 11, 21 or comparators 16, 26 of the processing circuits 15, 25, a failure that would result in the non-generation of the first synchronization signal ATON-LS and the second synchronization signal ATON-HS, respectively, each processing circuit 15, 25 may include an OR type logic gate 30 combining the output signal of the comparator 16, 26 and a control signal PWM-LS ($t_{TO}$) or PWM-HS ($t_{TO}$) (respectively, for the low-side switch 1 and high-side switch 2) delayed by a defined delay $t_{TO}$ (FIG. 6). In other words, the delayed control signal PWM-LS ($t_{TO}$) or PWM-HS ($t_{TO}$) changes to a state 1 with a delay of $t_{TO}$ compared to the control signal PWM-LS or PWM-HS.

Thus, the first and second synchronization signals ATON-LS, ATON-HS are always generated at the output of the processing circuits 15, 25, to form the first activation/deactivation signal $S_{LS}$ and the second activation/deactivation signal $S_{HS}$ for the activation of the low-side switch 1 and the high-side switch 2, respectively. A failure of the detection circuits 11, 21 or of the comparators 16, 26 of the processing circuits 15, 25 cannot interrupt the operation of the half-bridge electronic device 100.

Finally, for reasons of flexibility, the half-bridge electronic device 100 may comprise a system for neutralizing the function of automatic detection of the rising and/or falling edges of the voltage Vm at the central point 3 of the synchronization systems 10, 20. For example, the OR type logic gate 30 shown in FIG. 6 could have a third input (not shown) supplied with a digital signal set to the state 1 for neutralization: the activation/deactivation signals SHS, SLS at the output of the AND type logic gates (28, 30) then depend only on the PWM-HS, PWM-LS control signals.

The operation of the half-bridge electronic device 100 according to the present disclosure will now be described with reference to the chronogram in FIG. 3.

The example of a digital PWM input signal in a slot corresponding to an alternation of states 1 and 0 will now be considered. A first control signal PWM-LS, whose pulses are shifted by a fixed time $T_M$, and a second control signal PWM-HS, whose pulses are inverted and shifted with respect to the PWM input signal by a time $T_M$, are generated by means of a delay generating device 40. The dead-time $T_M$ is set according to the present disclosure to a minimum or even to a value of zero.

As shown in FIG. 3, the starting point of the chronogram corresponds to the state 1 for the PWM input signal, which generates a first control signal PWM-LS in the state 1 controlling the closing (activation) of the low-side switch 1. The voltage Vm at the central point 3 has a minimum value, typically 0.

When the PWM input signal passes to the state 0, the control signal PWM-LS also passes to the state 0 and the first control circuit 19 controls the deactivation (opening) of the low-side switch 1. The voltage Vm at the central point 3 increases to a maximum value, typically the voltage V.

The second synchronization system 20 interprets this rising edge of the voltage Vm at the central point 3 through its detection circuit 21. At the moment when the voltage Vm reaches its maximum value, or substantially earlier, depending on the set value of the voltage difference ($V_{c2}-V_{ref2}$), the second synchronization system 20, via its processing circuit 25, generates the second synchronization signal ATON-HS, which combines with the control signal PWM-HS in the AND type logic gate 28 to form the second activation/deactivation signal $S_{HS}$ at the output of the logic gate 28: the second synchronization signal ATON-HS allows the signal $S_{HS}$ to switch to activation mode (state 1) to command the closing (activation) of the high-side switch 2, within an optimized time $t_m$.

As soon as the input signal changes to the state 1, the control signal PWM-HS changes to the state 0 and the second control circuit 29 controls the deactivation (opening) of the high-side switch 2. When the control signal PWM-HS changes to the state 0, the memory point 27 of the processing circuit 25 of the second synchronization system 20 is reset to zero. The voltage Vm at the central point 3 decreases to a minimum value, typically 0.

The first synchronization system 10 interprets this falling edge of the voltage Vm at the central point 3 through its detection circuit 11. At the moment when the voltage Vm reaches its minimum value (or substantially earlier, depending on the set value of the voltage difference ($V_{c1}-V_{ref1}$)), the first synchronization system 10, through its processing circuit 15, generates the first synchronization signal ATON-LS, which combines with the control signal PWM-LS in the AND type logic gate 18 in order to form, at the output of said logic gate 18, the activation/deactivation signal $S_{LS}$: the first synchronization signal ATON-LS will switch the signal $S_{LS}$ into activation mode (state 1) to command the closing (activation) of the low-side switch 1 within an optimized time $t_m$.

It is noted that, although the optimized activation delays for the low-side switch 1 and the high-side switch 2 are both named $t_m$, their values may be different during the switching cycles.

When the PWM input signal returns to the state 0, the control signal PWM-LS also returns to the state 0, resetting the memory point 17 of the processing circuit 15 of the first synchronization system 10 to 0, and the first control circuit 19 controls the deactivation (opening) of the low-side switch 1, and so on. For each new alternating cycle of switching operations of the switches 1, 2, the synchronization systems 10, 20 will alternately generate the synchronization signals ATON-LS and ATON-HS to securely activate one switch 1, 2 at the earliest after the other switch 2, 1 has been deactivated.

According to a particular embodiment, at least one of the switches 1, 2 of the half-bridge electronic device 100 comprises a high-voltage transistor, making it possible to switch voltages from several tens of volts to a few hundred volts (for example, 400 V).

The high-voltage transistor can, for example, be formed from III-N materials such as gallium nitride (GaN). The transistor could be a HEMT ("high electron mobility transistor"). Alternatively, the high-voltage transistor can be formed on the basis of silicon.

In another particular embodiment, at least one of the switches 1, 2 of the half-bridge electronic device 100 comprises a high-voltage transistor in depletion mode in series with a low-voltage transistor in enhancement mode. The high-voltage transistor and the low-voltage transistor may form a cascade circuit, in which case the gate of the high-voltage transistor is connected to the source of the low-voltage transistor. Alternatively, they may form a cascade circuit, in which case the gate of the high-voltage transistor is controlled by a control circuit 19, 29.

The present disclosure also relates to a method of synchronizing the alternate activation of a low-side switch 1 and a high-side switch 2 in a half-bridge electronic device 100. The low-side switch 1 and the high-side switch 2 are respectively controlled by a first activation/deactivation signal $S_{LS}$ and a second activation/deactivation signal $S_{HS}$. The process comprises the following steps:

a) deactivating the low-side switch 1 when a first control signal PWM-LS changes to the state 0; said first control signal PWM-LS passes to the state 0 as soon as the PWM input signal passes to the state 0;

b) interpreting a variation along a rising edge of the voltage Vm at the central point 3 to generate a second synchronization signal ATON-HS 1;

c) activating (mode in which the passage is allowed) the high-side switch 2 by the second activation/deactivation signal $S_{HS}$ resulting directly from the combination, in an AND type logic gate 28, of the second synchronization signal ATON-HS and a second control signal PWM-HS;

d) deactivating the high-side switch 2 when the second control signal PWM-HS changes to the state 0; said second control signal PWM-HS passes to the state 0 as soon as the PWM input signal changes to the state 1;

e) interpreting a variation along a falling edge of the voltage Vm at the central point 3 to generate a first synchronization signal ATON-LS, separate from the second synchronization signal ATON-HS;

f) activating the low-side switch 1 by the first activation/deactivation signal $S_{LS}$ resulting directly from the combination, in an AND type logic gate 18, of the first synchronization signal ATON-LS and the first control signal PWM-LS.

Steps a) to f) are repeated for each new cycle of alternating switching operations of the low-side switch 1 and high-side switch 2.

Advantageously, in step d), the method includes a reset of the second synchronization signal ATON-HS; the reset occurs when the second control signal PWM-HS passes to the state 0.

Advantageously, in step a), the method also comprises a reset of the first synchronization signal ATON-LS; the reset occurs when the first control signal PWM-LS passes to the state 0.

The interpretation of the variation according to a rising edge of the voltage Vm at the central point 3 (step b) comprises the detection of a determined high level of said voltage Vm. The determined level may be the maximum value of the voltage Vm or alternatively a value significantly lower than the maximum value. The choice of the determined high level makes it possible to generate, more or less soon after the deactivation of the low-side switch 1, the second synchronization signal ATON-HS to activate the high-side switch 2.

The interpretation of the variation according to a falling edge of the voltage Vm at the central point 3 (step e)) comprises the detection of a determined low level of said voltage Vm. The low level determined may be the minimum value of the voltage Vm or alternatively a value significantly higher than the minimum value. The choice of the determined low level makes it possible to generate, more or less soon after the deactivation of the high-side switch 2, the first synchronization signal ATON-LS to activate the low-side switch 1.

Preferably, step b) is performed by interpreting a variation, along a falling edge, of the voltage (V-Vm) resulting from the difference between the input voltage V of the high-side switch 2 and the voltage Vm at the central point 3. The first and second synchronization systems 10, 20 can thus be formed by the same detection circuits 11, 21 and processing circuits 15, 25.

To compensate for a failure of the detection circuits 11, 21 or the comparators 16, 26 of the synchronization systems 10, 20, steps c) and f) of activating, respectively, the high-side switch 2 and the low-side switch 1 can be carried out after a defined delay $t_{TO}$ ("Time Out").

For this purpose, the method comprises a step b'), carried out in the event of a failure in step b), allowing the second synchronization signal ATON-HS to be generated after a defined delay $t_{TO}$; it also comprises a step e'), carried out in the event of a failure in step e), allowing the first synchronization signal ATON-LS to be generated after a defined delay $t_{TO}$.

The half-bridge electronic device 100 and the method according to the present disclosure can find applications in the field of DC-DC power converters, AC-DC power converters, etc.

Of course, the present disclosure is not limited to the embodiments described, and embodiment variations can be added without departing from the scope of the invention as defined by the claims.

The invention claimed is:

1. A half-bridge electronic device comprising:
   in series, a high-side switch and a low-side switch coupled at a central point, the low-side switch and the high-side switch being respectively controlled by a first and a second activation/deactivation signal;
   a first synchronization system configured to interpret a variation in a voltage at the central point along a falling edge and to generate a first synchronization signal, the first synchronization system includes:
      a first detection circuit that includes:
         a first capacitive element configured to generate a first transient current dependent on variations in the voltage at the central point;
         in series with the first capacitive element, a first diode and a first shunt resistor, configured to measure a voltage proportional to the first transient current;
   a second synchronization system configured to interpret a variation in the voltage at the central point along a rising edge and to generate a second synchronization signal separate from the first synchronization signal, the second synchronization system includes:
      a second detection circuit that includes:
         a second capacitive element configured to generate a second transient current dependent on variations in the voltage at the central point;
         in series with the second capacitive element, a second diode and a second shunt resistor, configured to measure a voltage proportional to the second transient current;
   a first AND-type logic gate configured to combine the first synchronization signal with a first control signal to generate the first activation/deactivation signal at an output of the first logic gate; and
   a second AND-type logic gate configured to combine the second synchronization signal with a second control signal to generate the second activation/deactivation signal at the output of the second logic gate.

2. The half-bridge electronic device of claim 1, wherein each of the first and second synchronization systems include a respective first and second processing circuit.

3. The half-bridge electronic device of claim 2, wherein each of the first and second processing circuits is configured to generate a respective first and second synchronization signal from measurements of the first and second detection circuits.

4. The half-bridge electronic device of claim 3, wherein each of the first and second processing circuits comprises a respective first and second voltage comparator and a respective first and second memory point.

5. The half-bridge electronic device of claim 4, wherein each of the respective first and second processing circuits comprises a respective first and second OR type logic gate between the respective first and second voltage comparator and the respective first and second memory point.

6. The half-bridge electronic device of claim 2, wherein each of the first and second processing circuits are configured to generate the first and second synchronization signal from measurements of the first and second detection circuits.

7. The half-bridge electronic device of claim 6, wherein each of the first and second processing circuits comprises a respective first and second voltage comparator and a respective first and second memory point.

8. The half-bridge electronic device of claim 7, wherein each of the first and second processing circuit comprises a respective first and second OR type logic gate between the respective first and second voltage comparator and the respective first and second memory point, the first and second processing circuits configured to combine respective first and second output signals of the respective first and second comparator with a respective first and second delayed control signal by a respective first and second defined delay.

9. The half-bridge electronic device of claim 1, wherein the first detection circuit and the second detection circuit are identical.

10. The half-bridge electronic device of claim 1, wherein at least one of the high-side and low-side switches comprises a high-voltage transistor.

11. The half-bridge electronic device of claim 10, wherein the high-voltage transistor is GaN-based.

12. A method, comprising:
synchronizing an alternate activation of a low-side switch and a high-side switch in a half-bridge electronic device, the synchronizing including:
deactivating the low-side switch when a first control signal passes to a state 0;
interpreting a variation along a rising edge of a voltage at a central point to generate a second synchronization signal;
activating the high-side switch by a second activation/deactivation signal resulting directly from the combining the second synchronization signal with a second control signal in an AND type logic gate;
deactivating the high-side switch when the second control signal passes to the state 0;
interpreting a variation along a falling edge of the voltage at the central point to generate a first synchronization signal separate from the second synchronization signal;
activating the low-side switch by a first activation/deactivation signal resulting directly from combining the first synchronization signal with the first control signal in an AND type logic gate;
generating a first transient current dependent on variations in the voltage at the central point with a first capacitive element in a first detection circuit in the first synchronization signal; and
measuring a voltage proportional to the first transient current with a first diode and a first shunt resistor current in series with the first capacitive element.

13. The synchronization method of claim 12, wherein the interpreting the variation along the rising edge of the voltage at the central point includes interpreting the variation, along the falling edge, of the voltage resulting from a difference between an input voltage of the high-side switch and the voltage at the central point.

14. The synchronization method of claim 12, further comprising in an event of failure in the interpreting the variation along the rising edge of the voltage at the central point, generating the second synchronization signal after a defined delay.

15. The synchronization method of claim 12, further comprising in an event of failure in the interpreting the variation along the falling edge of the voltage at the central point, generating the first synchronization signal after a defined delay.

16. A device comprising:
a half-bridge electronic circuit that includes:
a first switch that is configured to receive a first activation/deactivation signal;
a second switch coupled in series with the first switch at a central point, the second switch configured to receive a second activation/deactivation signal;
a first synchronization system that includes:
a first capacitive element configured to generate a first transient current dependent on variations in a voltage at the central point;
a first diode and a first resistor coupled to the first capacitive element, the first diode and first resistor configured to measure a voltage proportional to the first transient current, the first synchronization system configured to interpret a variation in the voltage along a falling edge and to generate a first synchronization signal;
a second synchronization system configured to generate a second synchronization signal;
a first AND-type logic gate configured to combine the first synchronization signal with a first control signal to generate the first activation/deactivation signal; and
a second AND-type logic gate configured to combine the second synchronization signal with a second control signal to generate the second activation/deactivation signal.

17. The device of claim 16 wherein the second synchronization system is configured to interpret a variation in the voltage at the central point along a rising edge and to generate the second synchronization signal that is separate from the first synchronization signal.

18. The device of claim 17, wherein the second synchronization system includes:
a second detection circuit that includes:
a second capacitive element configured to generate a second transient current dependent on variations in the voltage at the central point; and
in series with the second capacitive element, a second diode and a second shunt resistor, configured to measure a voltage proportional to the second transient current.

19. The device of claim 18 comprising first and second processing circuits that include a respective first and second OR type logic gate between a respective first and second voltage comparator and respective first and second memory points.

20. The device of claim 19 wherein the first and second processing circuits are configured to combine respective first and second output signals of the respective first and second voltage comparator with a respective first and second delayed control signal by a respective first and second defined delay.

\* \* \* \* \*

UNITED STATES PATENT AND TRADEMARK OFFICE
CERTIFICATE OF CORRECTION

| | |
|---|---|
| PATENT NO. | : 11,695,326 B2 |
| APPLICATION NO. | : 17/058101 |
| DATED | : July 4, 2023 |
| INVENTOR(S) | : Laurent Guillot et al. |

It is certified that error appears in the above-identified patent and that said Letters Patent is hereby corrected as shown below:

In the Claims

<u>Column 12, Claim 4, Line 63:</u>
"respective of first" should read: --respective first--.

<u>Column 13, Claim 12, Lines 39-40:</u>
"from the combining the" should read: --from combining the--.

Signed and Sealed this
Fifth Day of September, 2023

Katherine Kelly Vidal
*Director of the United States Patent and Trademark Office*